United States Patent [19]

Werner

[11] Patent Number: 4,682,358
[45] Date of Patent: Jul. 21, 1987

[54] ECHO CANCELLER

[75] Inventor: Jean J. Werner, Holmdel, N.J.

[73] Assignees: American Telephone and Telegraph Company, New York, N.Y.; AT&T Information Systems Inc., Morristown, N.J.

[21] Appl. No.: 677,974

[22] Filed: Dec. 4, 1984

[51] Int. Cl.⁴ .............................................. H04B 3/23
[52] U.S. Cl. ................................... 379/411; 379/410; 370/32.1
[58] Field of Search .......................... 179/170.2, 170.6; 364/724, 728; 333/165, 166; 370/32, 32.1; 379/406, 410, 411

[56] References Cited

U.S. PATENT DOCUMENTS

| Re. 31,253 | 5/1983 | Weinstein | 370/32.1 |
|---|---|---|---|
| 3,721,777 | 3/1973 | Thomas | 379/410 |
| 4,072,830 | 2/1978 | Gitlin et al. | 379/411 |
| 4,162,378 | 7/1979 | Baudoux et al. | 379/411 |
| 4,355,214 | 10/1982 | Lévy et al. | 370/32 |
| 4,370,741 | 1/1983 | Haass | 370/24 |
| 4,574,166 | 3/1986 | Gritton | 370/32.1 |
| 4,577,309 | 3/1986 | Barazeche et al. | 370/32 |

FOREIGN PATENT DOCUMENTS

| 0036696 | 9/1981 | European Pat. Off. | 179/170.2 |
|---|---|---|---|
| 0044598 | 1/1982 | European Pat. Off. | 179/170.2 |
| 2833518 | 2/1980 | Fed. Rep. of Germany | 179/170.2 |

OTHER PUBLICATIONS

"A Passband Data-Driven Echo Canceller for Full-Duplex Transmission on Two-Wire Circuits", S. B. Weinstein, Jul. 1977 *IEEE Trans. on Communications,* pp. 654–666.

*Primary Examiner*—Gene Z. Rubinson
*Assistant Examiner*—R. Vaas
*Attorney, Agent, or Firm*—Ronald D. Slusky

[57] ABSTRACT

Apparatus and a technique for echo cancellation is described in which the real and imaginary parts of an echo replica signal can evolve independently of each other. By removing the coupling heretofore found in cross coupled echo canceller structures, the echo replica obtained in conjunction with carrier-phase tracking circuitry can be a more exact duplicate of the real and imaginary components of a received echo containing signal. The echo canceller may include a plurality of subcancellers, each including at least four adaptive filters. Alternatively the filters within each subcanceller can be implemented by a suitably programmed digital signal processor.

12 Claims, 9 Drawing Figures

ECHO CANCELLER

BACKGROUND OF THE INVENTION

The present invention relates generally to the suppression of echoes in digital data transmission. In particular, this invention relates to the cancellation of echoes in a two-wire full-duplex data transmission system which has to deal with echoes having propagated through carrier systems in the telephone network.

DESCRIPTION OF THE PRIOR ART

Full-duplex data transmission over the direct-distance dialing (DDD) network has traditionally been achieved by using frequency-division multiplexing (FDM). With this technique, the calling and answering modems use different frequency bands for transmitting data. At high data rates ($\geq 4.8$ kb/s), FDM is not feasible because of the limited bandwidth of voice-grade circuits, and echo cancellation is the preferred technique to make efficient use of the available bandwidth. The general use of echo cancellation for achieving full-duplex data transmission over the DDD network is described in S. B. Weinstein in U.S. Pat. No. Re. 31,253, reissued May 24, 1983, and in the IEEE Transactions on Communications (July 1977, pp. 654–666) in a paper entitled "A Passband Data-Driven Echo Canceller for Full-Duplex Transmission on Two-Wire Circuits".

The above mentioned references also describe an echo canceller structure which is proposed for the intended application. In addition, the second reference describes an arrangement which allows the tracking of frequency offset in the "far or talker" echo. This is the echo which has propagated through the switched network, and is thus likely to be corrupted by the channel impairments which are commonly encountered in carrier systems. Frequency offset is the most damaging of these impairments. While propagating through the carrier systems, the far echo experiences several modulation and demodulation operations. As a result, due to clock mismatches in the modulators and demodulators, it can reappear at the input of the echo canceller with a carrier frequency (say 1800.1 Hz) which is slightly different from the carrier frequency of the transmitted signal (say 1800 Hz). Even such a small difference in carrier frequencies interferes with the ability of a conventional echo canceller to cancel the far echo when it has to adapt under "double-taking" (full-duplex) conditions.

Cancellation of a far echo corrupted by frequency offset can be achieved by using the right type of echo canceller structure and a phase-lock loop. One possible arrangement is given in the S. B. Weinstein reference in IEEE Transactions on Communications mentioned previously. Another possible arrangement is described in a European patent application (in French), entitled "Annuleur D'echo Pour Signal D'Echo A Phase Variable", by L. B. Y. Guidoux, (application No. 81200209.3, Mar. 19, 1981).

These two techniques for cancelling an echo corrupted by frequency offset work well in theory. That is, they should perfectly cancel the echo under ideal conditions of implementation. However, they can suffer serious degradation in performance when practical implementation considerations are taken into account. This is because the echo canceller structures used in these schemes cannot readily compensate, in an adaptive fashion, for the unavoidable imperfections in the practical implementation of the in-phase and quadrature filters which have to be used in front of the echo canceller. In view of the foregoing, it is the broad object of the present invention to provide an echo cancellation arrangement for use in full-duplex transmission on 2-wire circuits which allows the cancellation of an echo corrupted by frequency offset, and whose performance is not significantly limited by practical implementation constraints.

SUMMARY OF THE INVENTION

In accordance with the present invention, an echo canceller is described in which the real and imaginary outputs can evolve independently. By removing the coupling heretofore found in cross coupled echo canceller structures known in the art, the echo replica obtained with this echo canceller in conjunction with carrier-phase tracking circuitry can be a more exact duplicate of the real and imaginary components of a received echo-containing signal, despite the fact that these components are derived from the received signal by imperfect in-phase and quadrature phase filters.

In a first embodiment, the echo replica is obtained by applying symbols representing input data to a plurality of subcancellers each of which includes a plurality of adaptive filters. In each subcanceller, the real symbol sequence is applied to first and second adaptive filters, and the imaginary symbol sequence is applied to third and fourth adaptive filters. Each filter is arranged to form a sum of the weighed products of the stored symbol sequence and an ensemble of tap weights or coefficients. The coefficient ensemble is different for each of the filters, and is based upon a recursion using (1) the prior coefficient value, (2) the stored symbol sequence, and (3) a measure of the difference or error between the error replica and the received signal. The outputs of the first and third filters are algebraically combined to form one component (e.g., real) of the echo replica, while the outputs of the second and fourth filters are combined to form the other (e.g., imaginary) component. The subcanceller outputs are sequentially combined with the in-phase and quadrature-phase components of the received signal during each symbol interval.

In a second embodiment, the filters within each subcanceller are implemented by a digital signal processor arranged to (1) store the coefficient ensembles for each filtering operation, (2) store samples of the real and imaginary components of the input signal, (3) compute and sum the products of each coefficient ensemble with the appropriate ones of the stored input signal component samples, and (4) update the coefficient values as set forth above.

Either of the embodiments advantageously includes a phase locked loop for compensating for carrier-phase variations and frequency offset. A compensation term can be included in the echo replica signal components before the error representing the difference between the replica and the received signal is formed. Alternatively, the compensation can be accomplished by modifying the received signal before the error signal representing the aforesaid difference is formed.

BRIEF DESCRIPTION OF THE DRAWING

The features and advantages of the present invention will be better understood by consideration of the following detailed description when read in light of the accompanying drawings in which.

DETAILED DESCRIPTION

Figure 1:
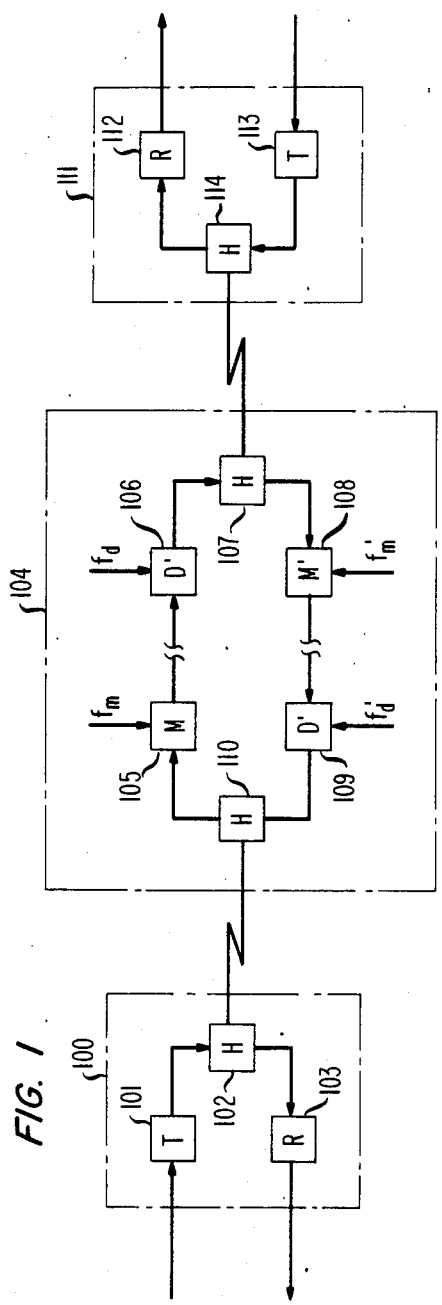
FIG. 1 is a block diagram illustrating the relationship between a local and a remote data set and a transmission channel interconnecting the two.

The objectives of the present invention will be understood from an examination of FIG. 1, which shows a typical connection over the switched network. Echoes arise because of impedance mismatches in the hybrid couplers 102, 110, 107 and 114 which make the connections between four-wire and two-wire transmission facilities. For example, consider modem 100. Some of the energy transmitted by transmitter 101 will leak through hybrid 102 and appear as an echo at the input of receiver 103. This echo is called the near echo. Similarly, at the other end of the carrier system 104, some energy will leak through hybrid 107. This signal is looped back through the carrier system and hybrids 110 and 102, and it will also appear as an echo at the input of receiver 103. This echo is called the "talker" or "far" echo.

The purpose of an echo canceller is to generate a replica of these echoes, which is then subtracted from the incoming signal at the input of the receiver. Thus, if such an arrangement is used in modem 100, and assuming ideal echo cancellation, the input to receiver 103 should only consist of the signal transmitted by transmitter 113 of the far modem 111, and some additive noise. In most applications, it is necessary to break the echo canceller into two parts, a near canceller and a far canceller. This is because the characteristics of the channels traversed by these two echoes are generally quite different. For example, the far echo propagates through the carrier system 104 and can therefore be corrupted by the channel impairments commonly encountered in these systems, such as non-linearities, phase jitter and frequency offset. The near echo is not plagued by these types of impairments. However, it can be corrupted by other types of impairments. The objective of the present invention is to provide an arrangement which allows the cancellation of a far echo which has been corrupted by frequency offset. The following discussions will concentrate on the far canceller, and it will be assumed that the near echo has been cancelled by a suitable near canceller.

The possibility of encountering frequency offset in the far echo can be understood by again referring to FIG. 1. After passing through hybrid 110, the signal transmitted by modem 100 is first modulated up to a frequency range suitable for transmission over the carrier system 104. This is done by modulator 105 which uses a modulation frequency $f_m$. At the other end of the connection, demodulator 106 shifts the modulated signal back to baseband by using a demodulation frequency $f_d$. In general, the frequencies $f_m$ and $f_d$ are very close but not quite equal, so that the frequencies of the signal appearing at the output of demodulator 106 will be slightly offset with respect to the frequencies of the signal at the input of modulator 105. As a matter of illustration, assume that a single sinewave f(t) with frequency $f_c$ is transmitted $$f(t) = \sin(2\Pi f_c t). \quad (1)$$

After modulation and demodulation in circuits 105 and 106 this sinewave becomes $$f_1(t) = A_1 \sin[2\Pi(f_c + f_m - f_d)t + \Phi_1]. \quad (2)$$

where $A_1$ and $\Phi_1$ are some arbitrary gain and phase, respectively. After leaking through hybrid 107 the far echo is again modulated by modulator 108 and demodulated by demodulator 109. Thus, illustratively, the sinewave in (1) after looping through the carrier system 104 becomes at the output of demodulator 109

$$f_2(t) = A_2 \sin[2\Pi(f_c + f_m - f_d + f_m' - f_d')t + \Phi_2], \quad (3)$$

where $A_2$ and $\Phi_2$ are again an arbitrary gain and phase, respectively. Usually, the frequencies $f_m'$ and $f_d'$ will again be slightly different. The sinewave in (3) will be offset in frequency with respect to the sinewave in (1) if $$\Delta f = f_m - f_d + f_m' - f_d' \neq 0. \quad (4)$$

Such a frequency offset occurs in carrier systems where the clocks of colocated modulators and demodulators (e.g., modulator 105 and demodulator 109) are not synchronized, that is, when $f_m \neq f_d'$ and $f_m' \neq f_d$. Frequency offset in the far echo has been observed in many carrier systems, and thus it has to be dealt with in echo-cancellation based modems.

The effect of frequency offset and other carrier-phase variations on the echo of a high-speed voiceband data signal is now considered. A two-dimensional (in-phase and quadrature) modulated signal generated by modems 100 and 111 in FIG. 1 is generally represented by the expression $$s(t) = Re\left[\sum_n A_n g(t - nT) e^{j\omega_c t}\right], \quad (5)$$

where $A_n = a_n + jb_n$ is the discrete-valued multilevel complex symbol to be transmitted, g(t) is a Nyquist pulse, 1/T is the symbol rate, $\omega_c/2\Pi$ is the carrier frequency, and Re denotes the real part of the quanity inside the brackets. In the usual case where the highest frequency component in g(t) is smaller that the carrier frequency, the complex signal in brackets in equation (5) is an analytic signal z(t), where $$Z(t) = s(t) + j\tilde{s}(t) = \left[ \sum_n A_n g(t - nT) e^{j\omega_c t} \right], \quad (6)$$

and where $\tilde{s}(t)$ is the Hilbert transform of s(t). After passing through an echo channel which introduces linear (delay and amplitude) distortion and carrier-phase variations, the signal in (6) becomes $$Z_1(t) = \sum_n A_n G(t - nT) e^{j[\omega_c t + \Phi(t)]}, \quad (7)$$

where $$G(t) = g_1(t) + j g_2(t) \quad (8)$$

is now a complex baseband impulse response, and $\Phi(t)$ represents the undesirable carrier phase fluctuations. In the case where $\Phi(t)$ consists only of a frequency offset $\Delta f$ it reduces to $$\Phi(t) = 2H\Delta ft. \quad (9)$$

The expression in (7) suggests two possible echo-cancellation arrangements which are now discussed. First, while the far echo available on the receiving legs of hybrids 102 and 114 in FIG. 1 is the real part of $Z_1(t)$ in (7), the complex signal $Z_1(t)$ can be constructed by passing the far echo through in-phase and quadrature filters. Ideally, the outputs of these filters will have frequency components with the same amplitude but phases which are 90 degrees apart at all frequencies. The complex signal $Z_1(t)$ which is now available at the outputs of the in-phase and quadrature filters can then be multiplied by the complex quantity $e^{-j\hat{\Phi}(t)}$, where $\hat{\Phi}(t)$ is an estimate of the carrier phase fluctuations introduced by the far echo channel. This estimate is obtained by using an adaptive phase-lock loop. Ideally, if $\hat{\Phi}(t) = \Phi(t)$ the complex multiplication removes the carrier phase variations from the far echo and a conventional echo canceller can now be used to cancel this echo.

Figure 3:
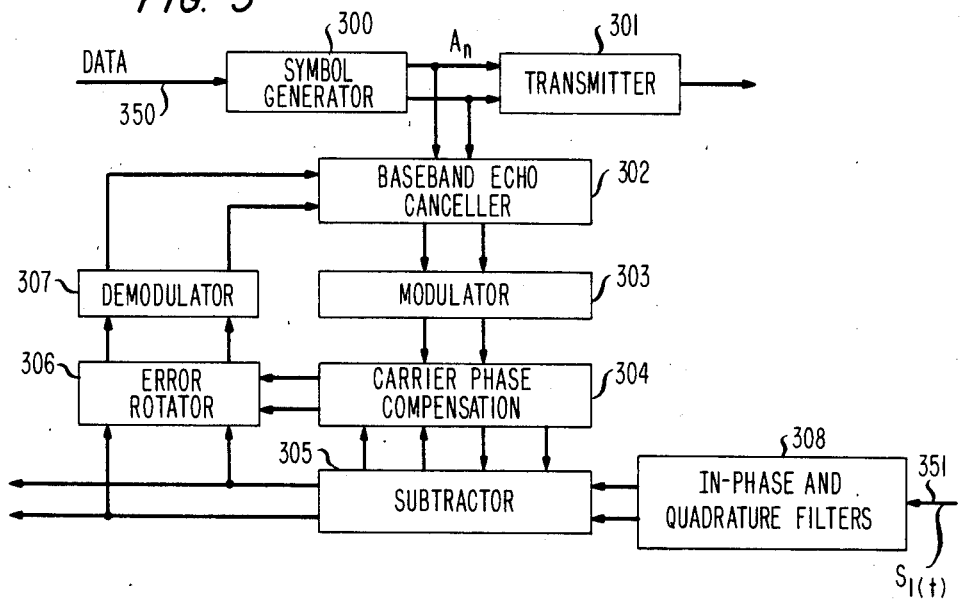
FIG. 3 is a generalized block diagram of a data set similar to the one shown in FIG. 2 but which incorporates a baseband echo canceller, rather than a passband echo canceller.

Alternatively, the carrier-phase compensation circuit can also be incorporated at the output of the echo canceller. Such an arrangement, which is direct mechanization of the expression in (7), was proposed in the second Weinstein reference and is shown in FIG. 3. The complex symbols $A_n$ at the output of symbol generator 300 generated in response to data applied on line 350 are passed through a baseband echo canceller 302 with complex impulse response $\hat{G}(t)$ which is an estimate of the complex baseband response G(t) in equation (7) of the far echo channel. The outputs of canceller 302 are multiplied by $e^{j\omega_c t}$ in complex modulator 303, where $\omega_c/2H$ is the carrier frequency of the transmitted signal. The outputs of modulator 303 are then multiplied by $e^{j\hat{\Phi}(t)}$ in carrier phase compensation circuit 304, where $\hat{\Phi}(t)$ is again an estimate of $\Phi(t)$, and is obtained by using a phase-lock loop (PLL). The resulting complex signal is an estimate of the complex signal obtained by passing the far echo $s_1(t)$ on line 351 through in-phase and quadrature filters 308. These two complex signals are subtracted from each other in subtractor 305. The resulting complex error is used to update the PLL in carrier-phase compensation circuit 304. After rotation in error rotator 306 and demodulation in demodulator 307 the complex error is also used to update the tap coefficients of baseband echo canceller 302.

Yet another type of echo cancellation arrangement can be obtained by rewriting equation (7) in the following way:

$$Z_1(t) = \sum_n A_n e^{j\omega_c nT} G(t - nT) e^{j\omega_c(t - nT)} e^{j\Phi(t)}, \quad (10)$$

or $$Z_1(t) = \sum_n A'_n R(t - nT) e^{j\Phi(t)}, \quad (11)$$

where $$A'_n = A_n e^{j\omega_c nT} \quad (12a)$$

and $$R(t) = G(t) e^{j\omega_c t}, \quad (12b)$$

and R(t) now represents the complex impulse response of a passband filter. The expression in (11) suggests the echo cancellation structure shown in FIG. 2. The complex symbols $A_n$ output from symbol generator 200 in response to input data on line 250 are first rotated in symbol rotation circuit 201 by multiplying them by $e^{j\omega_c nT}$. The rotated symbols can then be fed to in-phase and quadrature transmitting filters 202 and 222, respectively as proposed by J. J. Werner in U.S. Pat. No. 4,015,222, issued Mar. 29, 1977. The rotated symbols are also fed to a bulk delay line 203 which mimics the round-trip delay of the far echo through the carrier system 104 in FIG. 1. The length of delay line 203 is set at start up. The outputs of bulk delay line 203 are passed through a passband echo canceller 204 with complex impulse response $\hat{R}(t)$ which is an estimate of R(t) in (11). The outputs of this canceller are then multiplied by $e^{j\hat{\Phi}(t)}$ in carrier phase and frequency offset compensation circuit 210, where $\hat{\Phi}(t)$ is an estimate of $\Phi(t)$. A replica of the complex signal $Z_1(t)$ in (11) is now available at the inputs of subtractors 220 and 221. The purpose of the subcanceller selector switch 206 will be discussed later. The complex error derived at the outputs of subtractors 220 and 221 is used to update the PLL of the carrier phase compensation circuit 210. After rotation in error rotator 212 it is also used to update the tap coefficients of passband echo canceller 204. Finally, either the real or imaginary part of the complex error, or both, are sent to the modem's receiver via lines 251 and 252 for further processing.

The present invention can be used with all three echo cancellation arrangements described previously. The motivation for its use will be discussed with reference to the arrangement shown in FIG. 2. For simplicity of notation, the discussion will assume analog rather than digital samples. However, actual implementations utilize digital signal processing.

Figure 2:
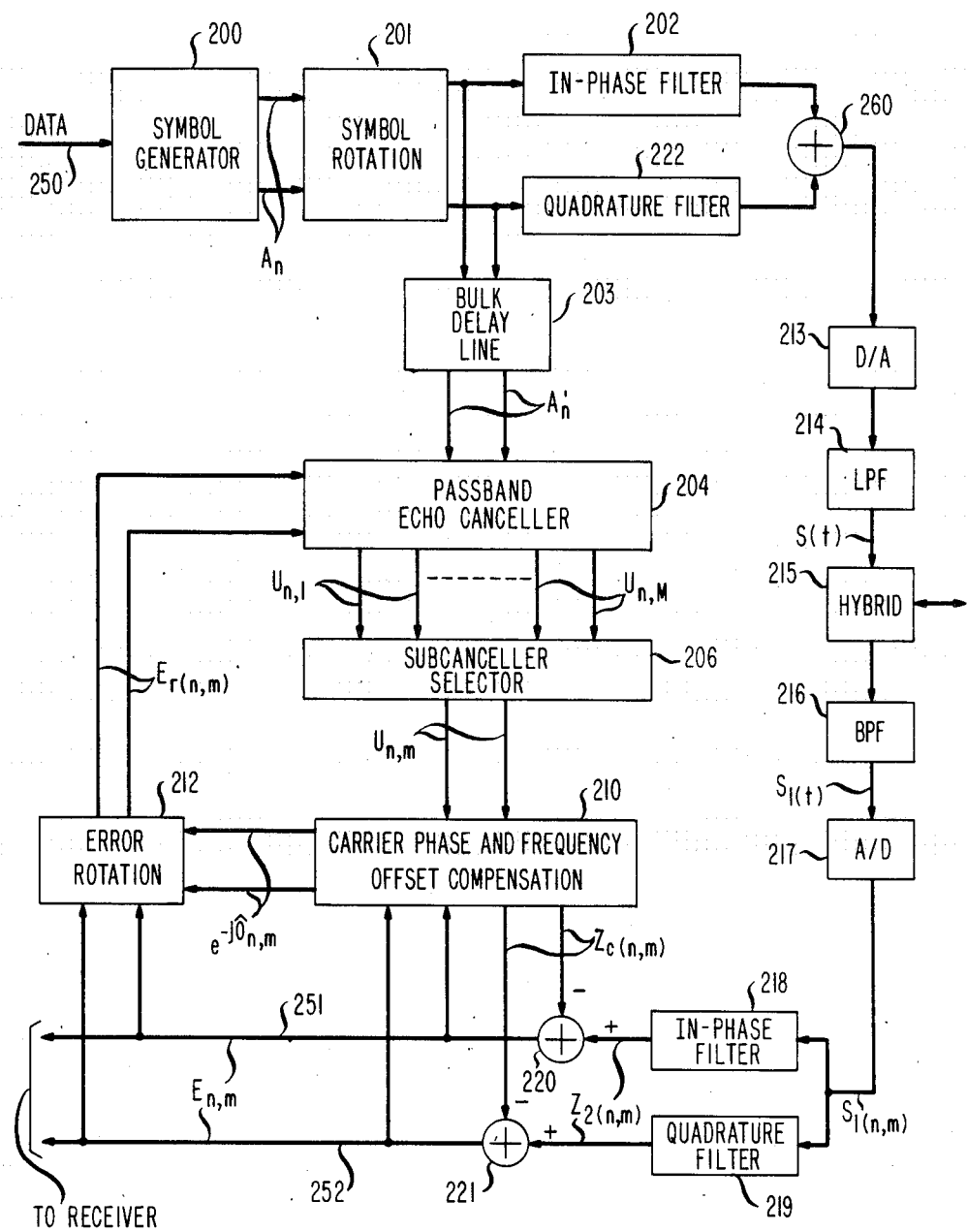
FIG. 2 is a block diagram of a portion of a data set indicating the relationship of its passband echo canceller to the remaining components and, in particular, one arrangement of a carrier phase and frequency offset compensation circuit.

Echo canceller 204 of FIG. 2 implements, in an adaptive fashion, an approximation $\hat{R}(t)$ of the far echo channel's complex passband response R(t) in equation (12b). That is, its output should approximate the quantity $$F_1(t) = \sum_n A_n R(t - nT). \quad (13)$$

From equation (12b), it can be shown that R(t) is an analytic signal. Therefore it can be written as $$R(t) = r(t) + j\tilde{r}(t). \tag{14}$$

where $\tilde{r}(t)$ is the Hilbert transform of r(t). Defining $A_n' = a_n' + jb_n'$, the expression in equation (13) can be rewritten as $$F_1(t) = \sum_n a_n' r(t - nT) - \sum_n b_n' \tilde{r}(t - nT) + \tag{15}$$

$$j \sum_n a_n' \tilde{r}(t - nT) + \sum_n b_n' r(t - nT).$$

Using the relation $\tilde{\tilde{r}}(t) = -r(t)$ it is readily shown that the complex signal in equation (15) is also an analytic signal. The expression in equation (15) suggests an echo canceller structure consisting of two adaptive filters whose impulse responses are made to converge to the impulse responses r(t) and $\tilde{r}(t)$. The output of each filter is computed twice, once with the symbols $a_n'$ as inputs and once with the symbols $b_n'$ as inputs. Proper subtraction and addition of the four possible outputs should then yield a good replica of the complex signal in equation (15).

Figure 4:
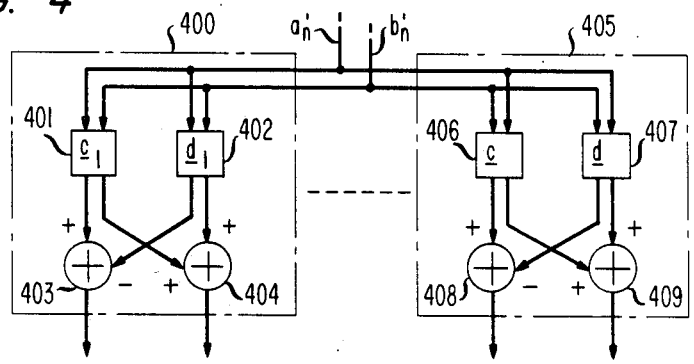
FIG. 4 illustrates a series of subcancellers including a cross coupled filter structure well known in the prior art.

An echo canceller structure which uses two adaptive filters whose outputs are computed twice, with two difference sets of inputs, is called a cross-coupled structure. Such a structure is depicted in circuit 400 of FIG. 4, where a digital implementation is assumed. The two filters 401 and 402 each receive the same two sets of inputs $a_n'$ and $b_n'$. Their outputs are computed twice and combined in the proper fashion in adders 403 and 404 to provide the echo canceller's complex output. In FIG. 4, the structure of circuit 400 is used several times in parallel, as illustrated by circuit 405. The need for doing so is explained later.

Cross-coupled structures of the type described in FIG. 4 were proposed in the Guidoux and Weinstein references. However, I have found experimentally that practical implementations of such cross-coupled structures do not provide a sufficient amount of echo cancellation. The reason for this can be understood from the following discussion, which assumes, for the purpose of explanation, that the echo channel does not introduce carrier-phase distortion, (i.e., $\Phi(t)$ in equation (11) is taken to be zero) so that the far echo is simply represented by the real part of $F_1(t)$ in equation (15). Ideally, the outputs of the in-phase filter 218 and quadrature filter 219 in FIG. 2 should be a Hilbert pair and provide the analytic signal given in equation (15). In practice, it is not possible to implement perfect in-phase and quadrature filters. As a result, the complex signal available after the filters will not be the analytic signal given in equation (15). Rather, it will be a complex signal $Z_2(t)$ which can be expressed as $$Z_2(t) = \sum_n a_n' r_1(t - nT) - \sum_n b_n' r_2(t - nT) + \tag{16}$$

$$j \sum_n a_n' r_3(t - nT) + \sum_n b_n' r_4(t - nT),$$

where $r_1(t)$ and $r_4(t)$, as well as $r_2(t)$ and $r_3(t)$ are not exactly equal, and where $r_2(t)$ and $r_3(t)$ are not exactly the Hilbert transforms of $r_1(t)$ and $r_4(t)$. An echo canceller using a cross-coupled structure tries to synthesize an analytic signal of the type give in equation (15), which can be generated by using only two sets of filters. Thus, it will not be able to make an exact replica of the signal give in equation (16) which requires the use of four different filters. In other words, a cross-coupled structure cannot compensate for the imperfections introduced by non-ideal, practically implemented in-phase and quadrature filters.

Figure 5:
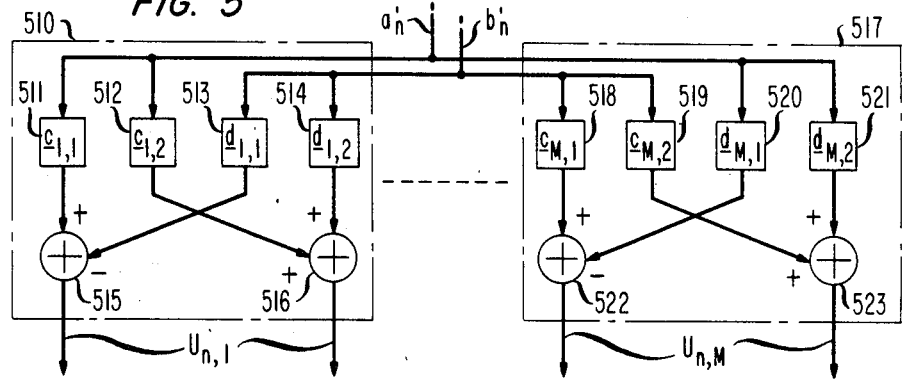
FIG. 5 illustrates a series of subcancellers arranged in accordance with the present invention.

An echo canceller structure which can compensate for these imperfections is shown in circuit 510 of FIG. 5. It consists of four sets of adaptive filters 511, 512, 513 and 514, which are adapted independently. After convergence, the impulse responses of these filters will have converged to the impulse responses $r_1(t)$, $r_2(t)$, $r_3(t)$ and $r_4(t)$ in equation (16). The need for replicating circuit 510 will be discussed later.

Figure 7:
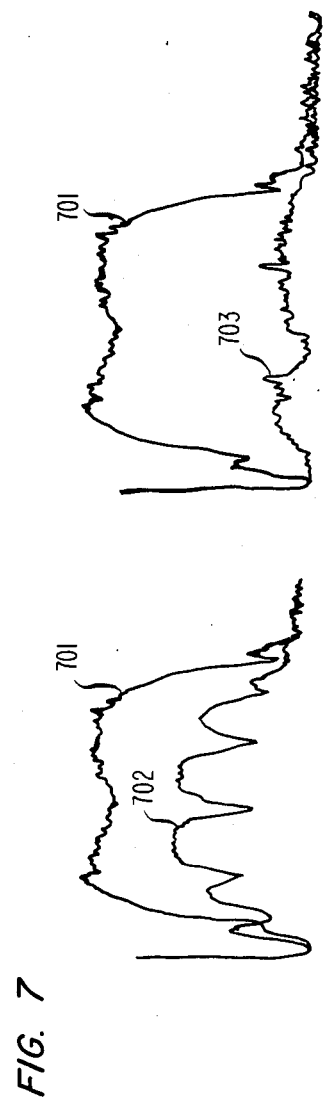
FIG. 7 illustrates comparative test results showing the advantageous operation of the present invention in removing energy derived from the remote echo in a signal received by a data set using the present invention.

The advantage of the new echo canceller structure of FIG. 5 compared to the cross-coupled structure of FIG. 4 is best appreciated with reference to FIG. 7, which shows two sets of traces obtained on a spectrum analyzer. In both sets, the upper trace 701 is the same and represents the power spectrum of the uncancelled echo at the input of subtractor 220 (or 221) in FIG. 2. The lower traces 702 and 703 represent the power of the residual echo after cancellation is performed, when either the cross-coupled structure of FIG. 4 or the new structure of FIG. 5 were used for echo canceller 204, respectively. The same in-phase and quadrature filters 218 and 219 were used in each case, and the two echo cancellers had the same memory span. Notice that the structure of FIG. 5 achieves a much larger amount of cancellation than the cross-coupled structure of FIG. 4. The measured difference in the amount of echo cancellation achieved was over 20 dB.

The digital implementation of the echo cancellation arrangement shown in FIG. 2 is now discussed. In the following discussion, the echo canceller arrangement of the present invention, as shown in FIG. 5, is used to implement the functions of echo canceller 204 of FIG. 2. The stream of data (0's or 1's) to be transmitted is first passed through symbol generator 200, which partitions the bit stream into blocks which are then mapped into symbols $A_n$ with real ($a_n$) and imaginary ($b_n$) parts. These symbols are rotated in rotation circuit 201 at the rate 1/T at which symbols are generated and fed to digital in-phase and quadrature passband filters 202 and 222. The rotated symbols are also used as inputs to bulk-delay line 203 whose purpose was explained earlier. As an example, if the data rate is 4800 bps and the symbol rate is 2400 bauds, then symbol generator 200 segments the data stream into blocks of two bits (dibits). Each bit of a dibit is mapped into values ±1 to provide the real and imaginary values of $a_n$ and $b_n$. These symbols are then rotated in circuit 201 according to equation (12). For example, if the carrier frequency is 1800 Hz, then the rotated complex symbol $A_n'$ is equal to $A_n(-j)^n$, where $A_n = a_n + jb_n$ is the non-rotated complex symbol generated by circuit 200.

The outputs of filters 202 and 222 are generated at a sampling rate which is usually larger than the symbol rate 1/T. The sum of the filters' outputs formed in adder circuit 260 is fed to digital-to-analog (D/A) converter 213 whose output is passed through interpolating low-pass filter 214 and then hybrid 215. On the receiving side of hybrid 215, the incoming or received signal is first passed through an antialiasing bandpass filter 216 and then an analog-to-digital (A/D) converter 217. In order to achieve Nyquist cancellation, the sampling rate of converter 217 has to be at least twice the highest frequency of the incoming signal, which is about 3 kHz for voiceband data communications. The advantages of Nyquist cancellation are discussed in the above mentioned Weinstein references. In practice, it is often advantageous to use the same sampling rate $1/T'$ for A/D converter 217 and the transmitting filters 202 and 222, although this is not necessary. The sampled values from A/D 217 are used as inputs to in-phase and quadrature filters 218 and 219. The outputs of these filters represent a complex signal from which is subtracted a complex replica of the far echo in subtractors 220 and 221.

In the following it will be assumed that the ratio $T/T'$ between the sampling rate $1/T'$ and the symbol rate $1/T$ is equal to an integer M. Thus, A/D converter 217 generates M sampled values of signal $s_1(t)$ in each symbol period T. The sampling times can then be written as $nT+mT'$, and the sampled values of $s_1(t)$ becomes $s_1(nT+mT')$, or, more concisely $s_{1(n,m)}$, where m = 1, 2, ... M, and n is the $n^{th}$ symbol period. With these conventions the complex output of in-phase and quadrature filters 218 and 219 is written as $Z_{2(n,m)}$ and the complex echo replica at the output of circuit 210 is written as $Z_{c(n,m)}$.

The delayed and rotated symbols $a_n'$ and $b_n'$ at the output of bulk delay line 203 are used as inputs to passband echo canceller 204, which, in accordance with the present invention consists of a parallel arrangement of M "subcancellers", 510, 517 shown in FIG. 5. Each subcanceller receives the same inputs $a_n'$ and $b_n'$, and consists of four different parallel adaptive filters. As an example, subcanceller 511 consists of filters 511, 512, 513 and 514. The outputs of filters 511 and 513 are subtracted in subtractor 515 and the outputs of filters 512 and 514 are added in adder 516. A similar filter arrangement is used for subcanceller 517 and the other subcancellers, not shown in FIG. 5. In the $n^{th}$ symbol period, each subcanceller generates a complex output $U_{n,m}$, where m = 1, 2, ... M designates the $m^{th}$ subcanceller.

The subcanceller selector 206 in FIG. 2 selects, in a cyclic fashion, the outputs of the subcancellers shown in FIG. 5. These outputs are selected at the sampling rate $1/T'$. Since there are M subcancellers and since the ratio between the symbol period T and the sampling period $T'$ is also M, each subcanceller will provide one output to selector 206 in each symbol period. Thus, for example, the first subcanceller 510 in FIG. 5 will provide an input to selector 206 in the first sampling period $T'$ of a given symbol period T, and the $M^{th}$ subcanceller 517 will provide an input to the selector in the $M^{th}$ (last) sampling period of the same symbol period.

In a first echo cancellation arrangement using the present invention, the outputs $U_{n,m}$ of selector 206 are the inputs of the carrier phase and frequency offset compensatio circuit 210. The operations performed by this compensation circuit yield the complex output $Z_{c(n,m)}$ defined by the following equation $$Z_{c(n,m)} = U_{n,m} e^{j\hat{\Phi}_{n,m}}, \qquad (17)$$

where $\hat{\Phi}_{n,m}$ is an estimate of the carrier-phase variations and frequency offset. This estimate is provided by a phase-lock loop (PLL) whose updating algorithm is described below.

The complex output $Z_{c(n,m)}$ of the compensation circuit 210 is subtracted from the complex output $Z_{2(n,m)}$ of the in-phase and quadrature filters 218 and 219, in subtractors 220 and 221. The result of the subtraction is a complex error $E_{n,m}$ given by $$E_{n,m} = e_{n,m} + j\tilde{e}_{n,m} = Z_{2(n,m)} - Z_{c(n,m)} \qquad (18)$$

which is used to update the phase of the PLL in the phase compensation circuit 210. After rotation in an error rotation circuit 212, the error is also used to update the tap coefficients of the passband echo canceller 204. Complex error rotation is performed in circuit 212 in a manner similar to that used in circuit 201; the result is a rotated error $E_{r(n,m)}$ given by:

$$E_{r(n,m)} = E_{n,m} e^{-j\hat{\Phi}_{n,m}} \qquad (19)$$

where $\hat{\Phi}_{n,m}$ is the carrier-phase estimate.

Figure 6:
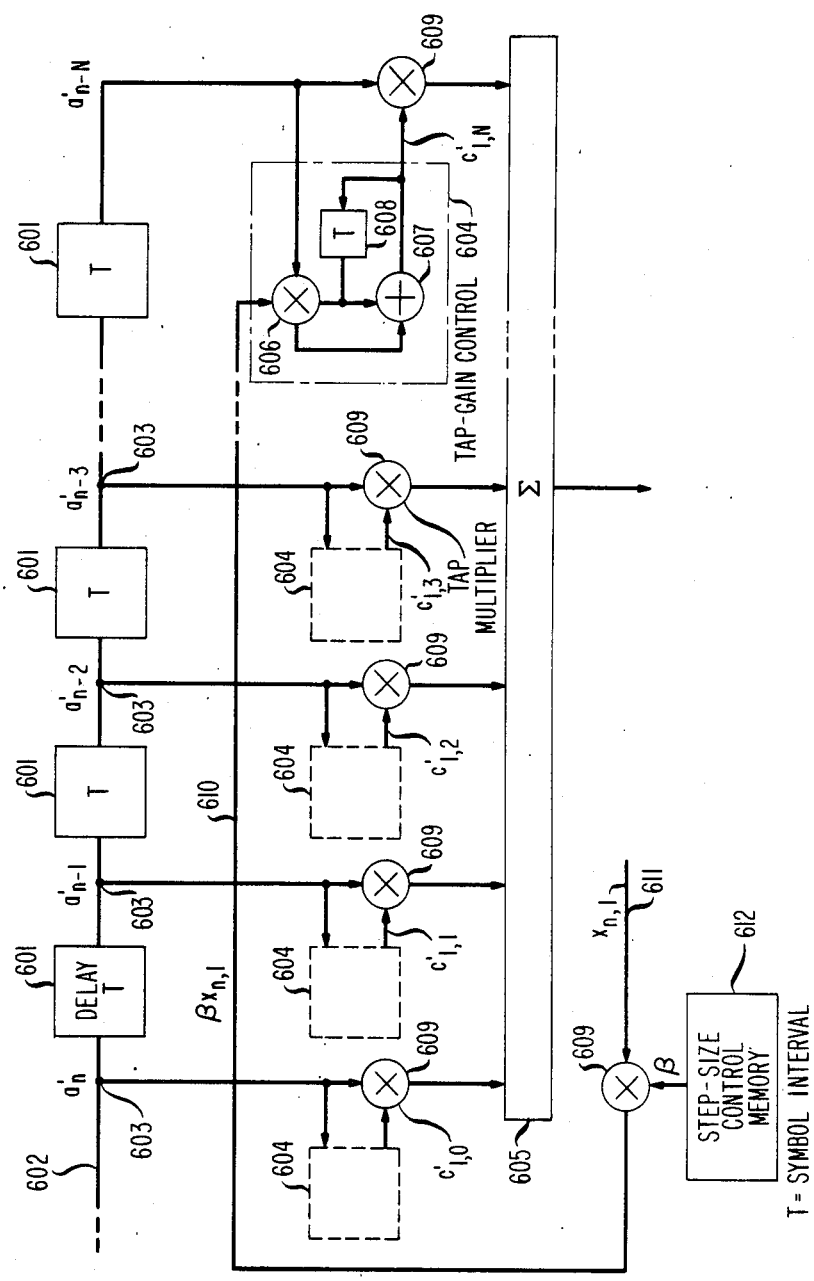
FIG. 6 is a diagram of one possible implementation for one of the filters shown in FIG. 5.

Before describing the updating algorithms used for canceller 204, it is necessary to specify the type of implementation used for the adaptive filters shown in FIG. 5. Transversal filters are preferred, although other types of filters could be used as well. The transversal filter implementation of one of the filters in FIG. 5, filter 511 in this case, is shown in FIG. 6. It consists of a tapped dealy line including a series of delay elements 601 each providing a dely spacing of interval T. In the case of filter 511 (and filter 512), the delayed elements in the delay line are the symbols $a_n'$. (In filters 513 and 514, the entries of the delay line are the symbols $b_n'$.) Individual multipliers 609 shown in FIG. 6 multiply the delayed symbols with the adaptive tap coefficients stored in memory elements 604. However, in a practical implementation, several or all of the tap coefficients will generally time share the same multiplier. The outputs of multipliers 609 are summed in adder 605, and the resulting sum, available on lead 613, is used as the input to adder 515 in FIG. 5.

In FIG. 5, the outputs of filters 512, 513 and 514 are computed in the same fashion as that used in filter 511. Once the outputs of adders 515 and 516 are available, they are used as inputs to subcanceller selector 206 of FIG. 2. Assuming that selector 206 is, at a particular time, configured so that subcanceller 510 has been selected, it will be observed that after carrier-phase compensation in circuit 209 and error computation in subtractors 220 and 221, the signals needed for updating the tap coefficients are available at the output of error rotation circuit 212. The correction terms used to form the tap updates for the $m^{th}$ subcanceller are obtained by using the so-called "least-mean-square" (LMS) algorithm. This algorithm minimizes the mean-squared error (MSE) $<E_{n,m}^2>$, where $$<E_{n,m}^2> = <e_{n,m}^2> + <\tilde{e}_{n,m}^2> \qquad (20)$$

in FIG. 2, and where $<\cdot>$ denotes expectation. In practice this algorithm is usually approximated by minimizing the squared error $$E_{n,m}^2 = e_{n,m}^2 + \tilde{e}_{n,m}^2, \qquad (21)$$

and using a stochastic-gradient algorithm. The relevant equations for the updating algorithm are obtained by first forming the gradient (partial derivative) of equation (21) with respect to the value of a tap coefficient, say $c_{1,N}$ in FIG. 6. For $c_{1,N}$, this gradient is found to be equal to $-x_{n,1}a_{n-N}$, where $x_{n,1}$ is the real part of $E_{r(n,1)}$) in FIG. 2. The gradient is then multiplied by a scaling factor $\beta$, and the result is used to update the value of $c_{1,N}$ in the opposite direction of the gradient. That is, a correction term $+\beta x_{n,1}a_{n-N}$ is added to $c_{1,N}$. Thus, the new value $c_{1,N}(n+1)$ in symbol period $(n+1)T$ of $c_{1,N}$ is related to the old value $c_{1,N}(n)$ in symbol period nT by the equation $$c_{1,N}(n+1) = c_{1,N}(n) + \beta x_{n,1}a_{n-N}. \quad (22)$$

One possible circuit useful in implementing equation (22) is shown in FIG. 6. The rotated error $(x_{n,1})$ received on line 611 from one output of circuit 212 is first multiplied in multiplier 609 by a scaling factor $\beta$ stored in a step-size control memory 612. The value of $\beta$ may assume different values at start up and in steady-state operation of the echo canceller. However, it is generally the same at any given instant of time for all of the filters and all of the subcancellers. Referring in particular to the tap-gain control circuit 604 which provides updating for tap $c_{1,N}$ in FIG. 6 it is seen that multiplier 606 forms the product of the scaled error $\beta x_{n,1}$ and the symbol $a_{n-N}'$. This symbol was previously multiplied with tap coefficient $c_{1,N}$ when the output of the filter was computed. A new value of tap coefficient $c_{1,N}$ is obtained by adding $\beta x_{n,1}a_{n-N}'$ to its previous value in adder 607. This new value then replaces the old value at the output of adder 607. In the next symbol period T, this new value of tap coefficient $c_{1,N}$ stored in relay element 608, will again be updated.

In many current implementations, the preceding sequence of operations performed by tap gain control circuit 604 are executed in a somewhat different way, using a digital signal processor including an arithmetic unit, a read only memory (ROM) for instruction storage, and a random access memory (RAM). The value of tap coefficient $c_{1,N}$ is first fetched from a storage location in the RAM, which serves as a coefficient store. This value is then added to the product $\beta x_{n,1}a_{n-N}$ by the arithmetic unit, which is time shared amongst all the tap coefficients. The result of the addition is then stored back in the same RAM storage location. The details of one computer based echo canceller arrangement are shown in U.S. Pat. No. 4,464,545 issued to applicant on Aug. 7, 1984, which is incorporated herein by reference. Other computer architectures well suited for echo canceller implementations are described in the book, "Bit-Slice Design: Controllers and ALUs," Garland STPM Press, by D. E. White.

Before discussing the equations giving the outputs and the updating algorithms of the four filters, the following definitions are needed. The quantities $\underline{a}_n'$ and $\underline{b}_n'$ designate column vectors of the real and imaginary symbols $a_n'$ and $b_n'$. Similarly, $\underline{c}_{m,1}(n)$, $\underline{c}_{m,2}(n)$, $\underline{d}_{m,1}(n)$ and $\underline{d}_{m,2}(n)$ designate column vectors representing the tap coefficients of the four filters used in subcanceller m. Formally:

$$\underline{a}_n' = \begin{bmatrix} a_n' \\ a_{n-1}' \\ \vdots \\ a_{n-N}' \end{bmatrix}, \quad \underline{b}_n' = \begin{bmatrix} b_n' \\ b_{n-1}' \\ \vdots \\ b_{n-N}' \end{bmatrix}, \quad (23)$$

$$\underline{c}_{m,i}(n) = \begin{bmatrix} c_{m,0}^i(n) \\ c_{m,1}^i(n) \\ \vdots \\ c_{m,N}^i(n) \end{bmatrix} \text{ and } \underline{d}_{m,i}(n) = \begin{bmatrix} d_{m,0}^i(n) \\ d_{m,1}^i(n) \\ \vdots \\ d_{m,N}^i(n) \end{bmatrix}, \quad (24)$$

where $i=1,2$ and $m=1,2,\ldots,M$. Illustratively, the $N+1$ entries of vector $\underline{a}_n$ are the symbols resident between delay elements 601 within each filter, at symbol period nT. Similarly, the $N+1$ entries of vector $\underline{c}_{1,1}(n)$ are the values of the tap coefficients stored in tap gain control circuits 604 at symbol period nT. With these notations the complex output of the $m^{th}$ subcanceller in the $n^{th}$ symbol period is given by $$U_{n,m} = u_{n,m}' + ju_{n,m}'' = \underline{a}_n'^T \cdot \underline{c}_{m,1}(n) - \quad (25)$$
$$\underline{b}_n'^T \cdot \underline{d}_{m,1}(n) + j[\underline{a}_n'^T \cdot \underline{c}_{m,2}(n) + \underline{b}_n'^T \cdot \underline{d}_{m,2}(n)],$$

where the superscript T denotes a transposed vector (row vector in this case), and the dots . denote the dot product of two vectors. Illustratively, consider the case where $m=1$ in FIG. 5. The output of filter 511 is obtained by computing the dot product $\underline{a}_n'^T \cdot \underline{c}_{1,1}(n)$ which, from equations (23) and (24), can be expressed as $$\underline{a}_n'^T \cdot \underline{c}_{1,1}(n) = a_n' c_{1,0}^1(n) + a_{n-1}' c_{1,1}^1(n) + \ldots$$
$$+ a_{n-N}' c_{1,N}^1(n). \quad (26)$$

Similarly, the outputs of filters 512, 513 and 514 are obtained by computing the dot products $\underline{a}_n'^T \cdot \underline{c}_{1,2}(n)$, $\underline{b}_n'^T \cdot \underline{d}_{1,1}(n)$ and $\underline{b}_n'^T \cdot \underline{d}_{1,2}(n)$, repectively. The outputs of subtractor 515 and adder 516 are the real $(u_{n,m}')$ and imaginary $(u_{n,m}'')$ parts of Equation (25), respectively, where m is equal to one.

Notice that the real and imaginary parts of the $m^{th}$ subcanceller's complex output $U_{n,m}$ in Equation (25) are computed by using two different sets of tap coefficients: $\underline{c}_{m,1}(n)$ and $\underline{d}_{m,1}(n)$ for the real part $u_{n,m}'$, and $\underline{c}_{m,2}(n)$ and $\underline{d}_{m,2}(n)$ for the imaginary part $u_{n,m}''$. By the way of comparison, in the case of the structure in FIG. 4 the same set of coefficients, $\underline{c}_m$ and $\underline{d}_m$, is used to compute both the real and imaginary parts of the complex output of the $m^{th}$ subcanceller. As a result there is a "coupling" between these two outputs, and they cannot evolve independently of each other. No such coupling exists in the case of the structure of FIG. 5 where $u_{n,m}'$ and $u_{n,m}''$ can assume values which are completely independent of each other. Thus, this structure is capable of synthesizing a larger variety of complex outputs than the structure in FIG. 4, and therefore it will generally provide a superior performance. The stochastic-gradient algorithms for updating the tap coefficients of the $m^{th}$ subcanceller are given by $$\underline{c}_{m,1}(n+1) = \underline{c}_{m,1}(n) + 2\beta \underline{a}_n' x_{n,m} \quad (27)$$

$$\underline{c}_{m,2}(n+1) = \underline{c}_{m,2}(n) + 2\beta \underline{a}_n' y_{n,m} \quad (28)$$

$$\underline{d}_{m,1}(n+1) = \underline{d}_{m,1}(n) - 2\beta \underline{b}_n' x_{n,m} \quad (29)$$

$$\underline{d}_{m,2}(n+1) = \underline{d}_{m,2}(n) + 2\beta \underline{b}_n' y_{n,m} \quad (30)$$

where $x_{n,m}$ and $y_{n,m}$ are the real and imaginary parts of the rotated error $E_{r(n,m)}$ and are generated by error rotation circuit 212 in FIG. 2 according to the equation $$E_{r(n,m)} = x_{n,m} + jy_{m,n} = (c_{n,m} + j\tilde{c}_{n,m})e^{-j\hat{\Phi}_{n,m}}, \quad (31)$$

and thus $$x_{n,m} = c_{n,m} \cos \hat{\Phi}_{n,m} + \tilde{c}_{n,m} \sin \hat{\Phi}_{n,m} \text{ and} \quad (32)$$

$$y_{n,m} = -c_{n,m} \sin \hat{\Phi}_{n,m} + \tilde{c}_{n,m} \cos \hat{\Phi}_{n,m}. \quad (33)$$

The quantity $\hat{\Phi}_{n,m}$ in equations (32) and (33) is the carrier phase estimate at time $nT+mT'$. It is also adapted according to a stochastic-gradient algorithm which is given by $$\hat{\Phi}_{n+1,m} = \hat{\Phi}_{n,m} - 2\alpha[c_{n,m}z_{c(n,m)}'' - \tilde{c}_{n,m}z_{c(n,m)}'], \quad (34)$$

where $\alpha$ is a scaling factor and $z_{c(n,m)}'$ and $z_{c(n,m)}''$ are the real and imaginary parts of $Z_{c(n,m)}$, the output of compensation circuit 210 in FIG. 2, respectively. That is:

$$Z_{c(n,m)} = z_{c(n,m)}' + jz_{c(n,m)}''. \quad (35)$$

Equation (34) describes a so-called first-order phase-lock loop (PLL). A more powerful, or second-order PLL is obtained in the following fashion. First, let $\Delta\hat{\Phi}_{n,m}$ be the non-scaled correction factor for the phase $\Phi_{n,m}$ in equation (34), that is:

$$\Delta\hat{\Phi}_{n,m} = c_{n,m}z_{c(n,m)}'' - \tilde{c}_{n,m}z_{c(n,m)}'. \quad (36)$$

A second-order PLL is then obtained by implementing the following equation:

$$\hat{\Phi}_{n+1,m} = \hat{\Phi}_{n,m} - 2\alpha\Delta\hat{\Phi}_{n,m} - 2\gamma \sum_{i=0}^{n} \Delta\hat{\Phi}_{i,m}. \quad (37)$$

The third term on the right of equation (37) is a scaled version of a running sum of successive phase correction terms. It can be shown that, in the absence of noise in the phase adjustment algorithm, this quantity can perfectly compensate for the presence of frequency offset in the far echo. Implementation of the first-order PLL in equation (34) will only allow for a partial compensation of the frequency offset in the far echo. If a small degradation in performance is permissible, then equation (37) need not be computed for each subcanceller, and phase updates can be performed once per symbol period by using only one subcanceller. This results in a simplification of implementation of the PLL.

Figure 9:
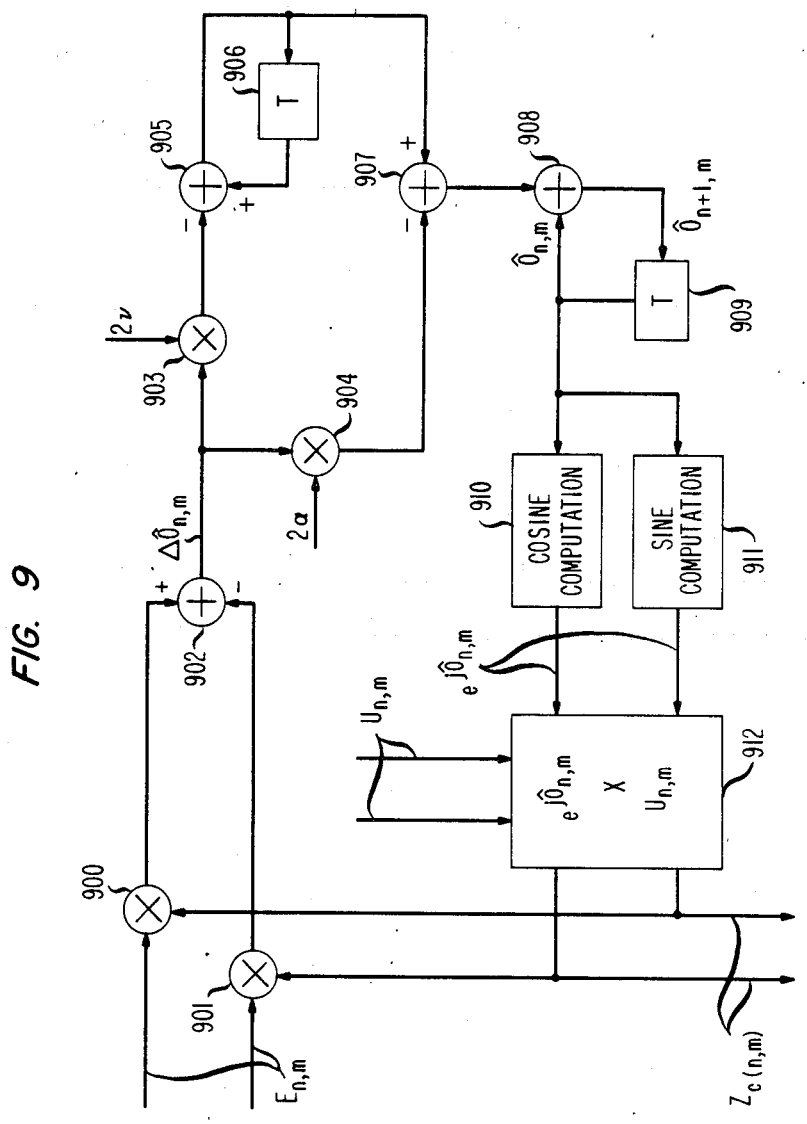
FIG. 9 is a detailed circuit diagram of one possible implementation of carrier phase and frequency offset compensation circuits 210 and 810 of FIGS. 2 and 8, respectively.

A detailed block diagram of the carrier-phase compensation circuit 210 in FIG. 2 is shown in FIG. 9. The phase increment $\Delta\hat{\Phi}_{n,m}$ given in equation (36) is obtained by first multiplying the real part of $E_{n,m}$ with the imaginary part of $Z_{c(n,m)}$ in multiplier 900 and the imaginary part of $E_{n,m}$ with the real and part of $Z_{c(n,m)}$ in multiplier 901, and then subtracting the results in subtractor 902. In many practical applications the multiplications performed by circuits 900 and 901, as well as the other multiplications discussed later, would be time-shared on one single multiplier.

The first-order correction term for updating the carrier-phase estimate (second term on the right in equation (37)), is obtained by multiplying the phase increment $\Delta\hat{\Phi}_{n,m}$ by $2\alpha$ in circuit 904. The second-order correction term (third term on the right in equation (37)) is implemented with multiplier 903, subtractor 905 and symbol-delay element 906. The first and second-order correction terms are subtracted from each other in subtractor 907, and the result is added, in adder 908, to the present estimate $\hat{\Phi}_{n,m}$ of the carrier phase. The output of adder 908 is a new estimate $\hat{\Phi}_{n+1,m}$ of the carrier phase that will be used in the next symbol period after being delayed in delay element 909.

The carrier-phase estimate $\hat{\Phi}_{n,m}$ in equation (37) is used as the argument of cosine and sine generators in circuits 910 and 911, respectively. These generators can be implemented by using a ROM look-up technique or by computing power expansions of the sine and cosine functions. The resulting quantities, sin $\hat{\Phi}_{n,m}$ and cos $\hat{\Phi}_{n,m}$, are used twice. First, they are used to rotate the complex output $U_{n,m}$ of subcanceller selector 206, in FIG. 2, to provide the echo replica $Z_{c(n,m)}$. The rotation is done in circuit 912 which implements the arithmetic operations given in equation (17). Expanding equation (17), one gets:

$$Z_{c(n,m)} = U_{n,m}e^{j\hat{\Phi}_{n,m}} = u_{n,m}' \cos \hat{\Phi}_{n,m} - u_{n,m}'' \sin \hat{\Phi}_{n,m} + j[u_{n,m}' \sin \hat{\Phi}_{n,m} + u_{n,m}'' \cos \hat{\Phi}_{n,m}], \quad (38)$$

where $u_{n,m}'$ and $u_{n,m}''$ are the real and imaginary parts of $U_{n,m}$, respectively, that is:

$$U_{n,m} = u_{n,m}' + ju_{n,m}''. \quad (39)$$

The quantities sin $\hat{\Phi}_{n,m}$ and cos $\hat{\Phi}_{n,m}$ are also inputs to error rotator 212, in FIG. 2, which provides the errors for the tap updates of passband echo canceller 204. The error rotation is done in accordance with equation (19) which can be expanded in a manner similar to equation (38).

Figure 8:
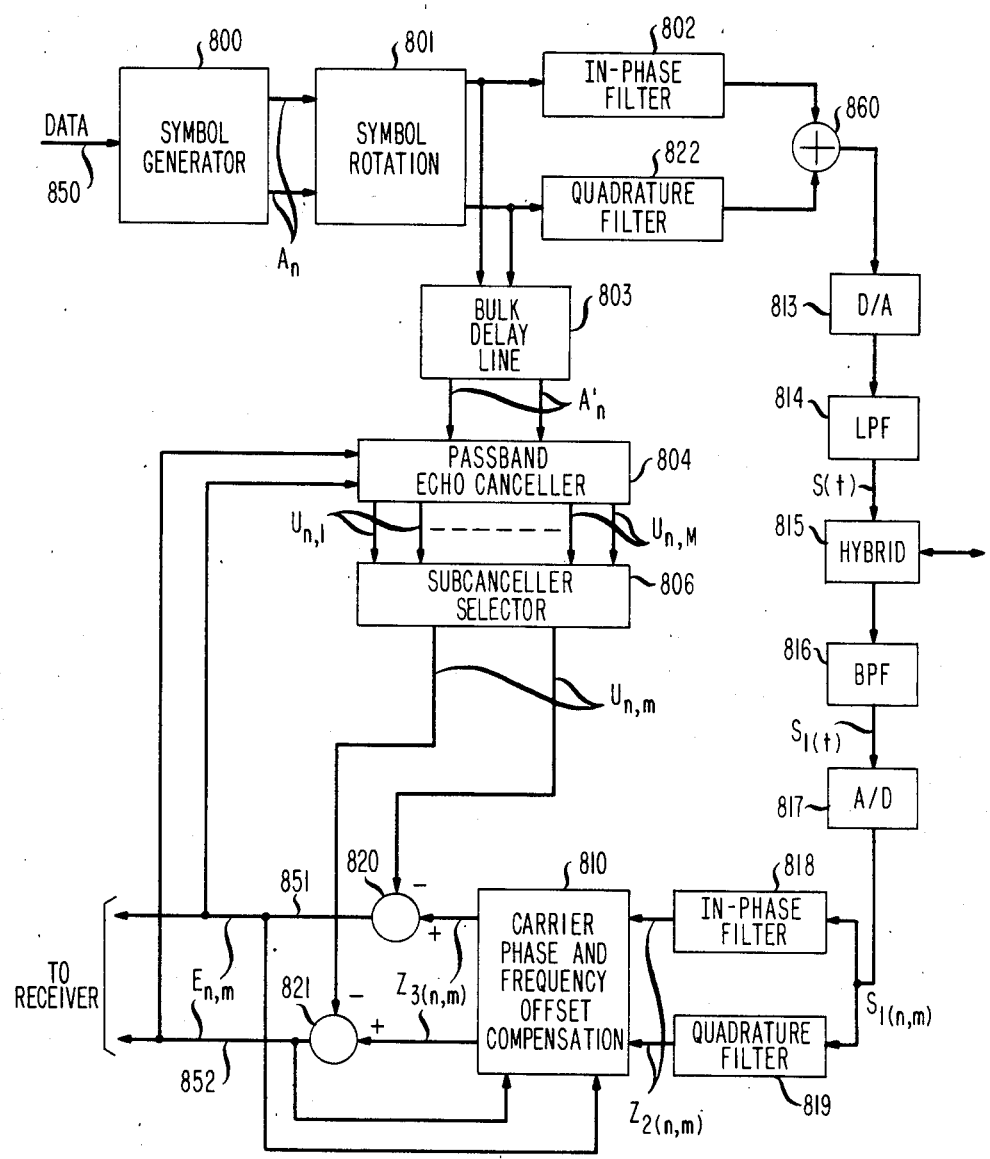
FIG. 8 is a block diagram of a portion of a data set indicating the relationship of its passband echo canceller to the remaining components and, in particular, another arrangement of a carrier phase and frequency offset compensation circuit.

FIG. 8 shows a second echo cancellation arrangement using the present invention, in which a numbering scheme similar to that of FIG. 2 is used. In FIG. 8, elements which perform functions similar to those of elements in FIG. 2 have a designation of 8xx rather than 2xx. In FIG. 8, carrier-phase and frequency-offset compensation circuit 810 is now located after the output of in-phase and quadrature filters 818 and 819 rather than after the echo canceller's output. The output $Z_{3(n,m)}$ of this circuit is obtained from its input $Z_{2(n,m)}$ by implementing the following equation:

$$Z_{3(n,m)} = Z_{2(n,m)}e^{-j\hat{\Phi}_{n,m}}, \quad (40)$$

where $\hat{\Phi}_{n,m}$ is an estimate of the carrier-phase variation and frequency offset. The arrangement in FIG. 8 removes the carrier-phase variation and frequency offet from the incoming signal before echo cancellation is performed. As a result there is no need to rotate the complex error $E_{n,m}$ before updating the echo canceller's tap coefficients, as was done by circuit 212 in FIG. 2. The relevant tap-update algorithms now become:

$$\underline{c}_{m,1}(n+1) = \underline{c}_{m,1}(n) + 2\beta_a n e_{n,m}' \quad (41)$$

$$\underline{c}_{m,2}(n+1) = \underline{c}_{m,2}(n) + 2\beta_a \tilde{n} e_{n,m}' \quad (42)$$

$$\underline{d}_{m,1}(n+1) = \underline{d}_{m,1}(n) - 2\beta_b n e_{n,m}' \quad (43)$$

$$\underline{d}_{m,2}(n+1) = \underline{d}_{m,2}(n) + 2\beta_b n \tilde{e}_{n,m}' \quad (44)$$

where $e_{n,m}$ and $\tilde{e}_{n,m}$ are the in-phase and quadrature errors, respectively.

The estimate $\hat{\Phi}_{n,m}$ of the carrier variation and frequency offset is now updated according to the equation $$\hat{\Phi}_{n+1,m} = \hat{\Phi}_{n,m} - 2\alpha \Delta \hat{\Phi}_{n,m} - 2\nu \sum_{i=0}^{n} \Delta \hat{\Phi}_{i,m}, \quad (45)$$

where $$\Delta \hat{\Phi}_{n,m} = e_{n,m} z_{3(n,m)}{}'' - \tilde{e}_{n,m} z_{3(n,m)}{}'. \quad (46)$$

In equation (46) $z_{3(n,m)}{}'$ and $z_{3(n,m)}{}''$ represent the real and imaginary parts of $Z_{3(n,m)}$, that is $$Z_{3(n,m)} = z_{3(n,m)}{}' + j z_{3(n,m)}{}''. \quad (47)$$

The block diagram for carrier-phase compensation circuit 810 is the same as the one shown in FIG. 9 except for the following modifications: $U_{n,m}$ is replaced by $Z_{2(n,m)}$; $Z_{c(n,m)}$ is replaced by $Z_{3(n,m)}$; $e^{j\hat{\Phi}_{n,m}}$ in circuit 912 is replaced by $e^{-j\hat{\Phi}_{n,m}}$.

Various modifications and adaptations of the present invention will be apparent to those skilled in the art. For this reason, it is intended that the present invention be limited only by the appended claims. For example, it is to be understood that the use of subcancellers such as shown in FIGS. 4 and 5 are not mandatory and that a single echo replica can be computed in each symbol interval. A data set which incorporates such an arrangement is shown in FIG. 7 of the paper entitled "A New Digital Echo Canceller for Two-Wire Full-Duplex Data Transmission," IEEE Trans. on Communications, September 1976, by K. H. Mueller.

It is also to be clearly understood that carrier-phase and frequency-offset compensation circuits 210 and 810 in FIGS. 2 and 8, respectively, need not be incorporated in a data set otherwise arranged in accordance with the instant invention if there is no need to compensate for carrier phase variations and frequency offset. Such might be the case, for example, in data sets intended for use only on the U.S. network. In this event, error rotation circuit 212 would also be unnecessary.

An alternative arrangement may also be considered in which symbol rotation circuit 201 and 801 of FIGS. 2 and 8, respectively and in-phase and quadrature phase filters 202 and 222 of FIG. 2 and 802 and 822 of FIG. 8 are replaced by lowpass filters and sine and cosine modulators to yield the more conventional QAM modulation structure as shown, for example, in FIG. 1 of the paper entitled "On the Selection of a Two-Dimensional Signal Constellation in the Presence of Phase Jitter and Gaussian Noise," Bell System Technical Journal, July–August, 1973, by G. J. Foschini et al. In this event, the symbol rotation circuit would nevertheless be used at the input or output of bulk delay line 203 or 803, as appropiate.

What is claimed is:

1. Apparatus for forming a complex cancellation signal representative of the echo generated when a modulated data signal is applied to a communication channel, said modulated data signal having in-phase and quadrature phase components formed in response to a sequence of complex symbols, said apparatus comprising
   (1) means for forming in-phase and quadrature phase components of a signal received from said communication channel, said received signal including an echo component, and
   (2) means for forming a current estimate of said components of said received signal as a function of the sum of the weighted product of (a) the values of current and past ones of said symbols in said sequence, and (b) a plurality of adaptively updated tap coefficients,
   wherein said current estimate forming means includes
   (3) at least four transversal filters each arranged to have a transfer characteristic which adapts independently of the others, a first pair of said transversal filters responsive to the real part of the current and past symbol values in response to which said in-phase component of said modulated data signal was formed and a second pair of said transversal filters responsive to the imaginary part of the current and past symbol values in response to which said quadrature phase component of said modulated data signal was formed, and
   (4) means for algebraically combining the outputs of the filters from each of said pairs to form components of said complex cancellation signal which form independently of each other.

2. Echo cancellation apparatus for use in conjunction with circuitry which transmits a passband signal representing complex data symbols each having a first component and a second component and which receives a signal which includes an echo of said transmitted signal, said apparatus comprising
   means for forming in-phase and quadrature phase versions of said received signal,
   first, second, third and fourth real filters,
   means for applying the first component of said data symbols to said first and second filters, and the second component of said data symbols to said third and fourth filters, respectively,
   means for combining the outputs of said first and third filters with said in-phase version of said received signal to form the in-phase component of an echo compensated signal,
   means for combining the outputs of said second and fourth filters with said quadrature phase version of said received signal to form the quadrature phase component of said echo compensated signal, and
   means for updating the transfer characteristics of each of said first through fourth filters independently of one another in response to said echo compensated signal in such a way that, over time, energy in said echo compensated signal derived from said echo is minimized.

3. Apparatus comprising
   means for transmitting a signal s(t) of the form $$s(t) = Re\left[ \sum_n (a_n + jb_n)g(t - nT)e^{j\omega_c t} \right]$$

where $a_n$ and $b_n$ are real numbers respectively representing real and imaginary data symbol components, g(t) is a real impulse response function, T is a predetermined symbol interval, n is an index which advances at a rate of 1/T, and $\omega_c$ is a selected radian carrier frequency,
   means for receiving a signal which includes an echo of said transmitted signal,
   means for forming at least a first echo replica sample during each of a succession of T second intervals, each echo replica sample being formed by forming a weighted sum of current and previous ones of said real and imaginary data symbol components, and means for combining each of the echo replica samples with a respective sample of the received signal to form a plurality of echo compensated samples, wherein said replica forming means includes means for computing real and imaginary components of said echo replica such that said real and imaginary components of said echo replica form independently of each other.

4. Apparatus combining means for transmitting a passband signal representing data symbols, said signal having a first in-phase component and a second quadrature phase component, means for receiving a signal which includes an echo of the transmitted signal, a plurality of subcancellers, each subcanceller including at least first, second, third and fourth filters, means for applying delayed versions of said first component to said first and second filters, and delayed versions of said second component to said third and fourth filters, respectively, means for combining the outputs of said filters with said received signal to form an echo compensated signal, and means for updating the transfer characteristics of each of said filters independently of one another in response to said echo compensated signal in such a way that, over time, energy in said echo compensated signal derived from said echo is minimized.

5. Echo cancellation apparatus for use in conjunction with circuitry adapted to transmit a double sideband-quadrature carrier signal representing a stream of complex data symbols occurring at a rate of 1/T, said circuitry being further adapted to receive a signal which includes an echo of said transmitted signal, said echo cancellation apparatus comprising means for forming at least a first echo replica sample during each of a succession of T second intervals, said echo replica sample having independently developed real and imaginary components, the real component of each echo replica sample being formed by forming during each of said T second intervals, in response to signals equal to the real and imaginary components of said complex data symbols, a weighted sum of said real and imaginary components of said complex data symbols, the weighted sum formed during any particular one of said T second intervals being a function of the products of each of said real and imaginary components of said complex data symbols with a respective coefficient of a first plurality of coefficients, the imaginary component of each echo replica sample being formed by forming during each of said T second intervals, in response to signals equal to the real and imaginary components of said complex data symbols, a weighted sum of said real and imaginary components of said complex data symbols, the weighted sum formed during any particular one of said T second intervals being a function of the products of each of said real and imaginary components of said complex data symbols with a respective coefficient of a second plurality of coefficients, means for combining each of the echo replica samples with a respective sample of said received signal to form a plurality of echo compensated samples, and means for determining the values of said coefficients in response to a least ones of said echo compensated samples and at least ones of said complex data symbols.

6. Echo cancellation apparatus for use in conjunction with circuitry which transmits a passband signal representing data symbols each having a first component and a second component and which receives a signal which includes an echo of said transmitted signal, said apparatus comprising means for separating said received signal into in-phase and quadrature phase components, a plurality of subcancellers each including means for forming first and second weighted products of said first component and first and second coefficient pluralities, respectively, and third and fourth weighted products of said second component and third and fourth coefficient pluralities, respectively, each of said first, second, third and fourth coefficient pluralities being formed independently of one another, means for combining said first and third weighted products to form an in-phase component of an echo replica, means for combining said second and fourth weighted products to form a quadrature phase component of said echo replica, means for combining said in-phase and quadrature phase components with said received signal to form an echo compensated signal, and means for updating said coefficient pluralities in response to said echo compensated signal.

7. An echo cancellation technique for use in conjunction with circuitry adapted to transmit a double sideband-quadrature carrier signal representing a stream of complex data symbols occurring at a rate of 1/T, said circuitry being further adapted to receive a signal which includes an echo of said transmitted signal, said echo cancellation technique comprising the steps of:

forming at least a first echo replica sample during each of a succession of T second intervals, said echo replica sample having independently developed real and imaginary components, wherein said forming step includes (a) forming the real component of each echo replica sample, in response to signals equal to the real and imaginary components of said complex data symbols, as a weighted sum of said real and imaginary components of said complex data symbols, the weighted sum formed during any particular one of said T second intervals being a function of the products of each of said real and imaginary components of said complex data symbols with a respective coefficient of a first plurality of coefficients, and (b) forming the imaginary component of each echo replica sample, in response to signals equal to the real and imaginary components of said complex data symbols, as a weighted sum of said real and imaginary components of said complex data sumbols, the weighted sum formed during any particular one of said T second intervals being a function of the products of each of said real and imaginary components of said complex data symbols with a respective coefficient of a second plurality of coefficients, combining each of the echo replica samples with a respective sample of said received signal to form a plurality of echo compensated samples, and determining the values of said coefficients in response to at least ones of said echo compensated samples and at least ones of said complex data symbols.

8. Echo cancellation apparatus for use in conjunction with circuitry adapted to transmit a signal s(t) of the form $$s(t) = Re\left[ \sum_n (a_n + jb_n)g(t - nT)e^{j\omega_c t} \right]$$

where $a_n$ and $b_n$ are real numbers respectively representing real and imaginary data symbol components, g(t) is a real impulse response, T is a predetermined symbol interval, n is an index which advances at a rate of 1/T, and $\omega_c$ is a selected radian carrier frequency, said circuitry being further adapted to receive a complex signal which includes an echo of the transmitted signal, said echo cancellation apparatus comprising means for forming a plurality of complex echo replica samples during each of a succession of T second intervals, and means for combining each of the echo replica samples with a respective sample of said received signal to form a plurality of echo compensated samples, wherein said means for forming includes a plurality of subcancellers each including (1) at least first, second, third, and fourth adaptive filters, each of said adaptive filters being arranged to adapt independently of one another, said first and second filters responsive only to said real data symbol components and said third and fourth filters responsive only to said imaginary data symbol components, and (2) means for algebraically combining the outputs of said first and third filters to form the real part of said echo replica samples and for algebraically combining the outputs of said second and fourth filters to form the imaginary part of said echo replica samples, whereby said real and imaginary parts of said echo replica samples are independently formed notwithstanding an interdependence between the real and imaginary parts of said received signal.

9. A method for cancelling the echo component contained in a received signal as a result of transmitting on an echo-inducing transmission medium a signal s(t) of the form $$s(t) = Re\left[ \sum_n (a_n + jb_n)g(t - nT)e^{j\omega_c t} \right]$$

where $a_n$ and $b_n$ are real numbers respectively representing real and imaginary data symbol components, g(t) is a real impulse response function, T is a predetermined symbol interval, n is an index which advances at a rate of 1/T, and $\omega_c$ is a selected radian carrier frequency, including the steps of:

forming at least a first echo replica sample during each of a succession of T second intervals, each echo replica sample being formed by forming a weighted sum of current and previous real and imaginary data symbol components, and combining each of the echo replica samples with a respective sample of said received signal to form a plurality of echo compensated samples, wherein said replica forming step includes the step of computing real an imaginary components of said echo replica such that said components can evolve independently of each other.

10. Echo cancellation apparatus for use in conjunction with circuitry which transmits a passband signal representing first and second streams of data symbol components and which receives a signal which includes an echo of said transmitted signal, new components of each symbol stream occurring at T second baud intervals, said apparatus comprising means for storing a plurality of tap coefficients, means for forming M echo replica samples associated with each baud interval, M being a selected integer, the $m^{th}$ of the M echo replica samples associated with the $n^{th}$ baud interval being formed in accordance with $$U_{n,m} = u'_{n,m} + ju''_{n,m}$$
$$= \underline{a'}_n^T \cdot \underline{c}_{m,1}(n) - \underline{b'}_n^T \cdot \underline{d}_{m,1}(n) + j[\underline{a'}_n^T \cdot \underline{c}_{m,2}(n) + \underline{b'}_n^T \cdot \underline{d}_{m,2}(n)]$$

where the superscript T denotes a transposed vector, the dots · denote the dot product of two vectors, $\underline{a}_n'$ is a vector which represents a sequence of the most recent data symbol components of said first stream of data symbol components, $\underline{b}_n'$ is a second vector which represents a sequence of the most recent data symbol components of said second stream of data symbol components, $\underline{c}_{m,1}(n)$, $\underline{d}_{m,1}(n)$, $\underline{c}_{m,2}(n)$ and $\underline{d}_{m,2}(n)$ are vectors representing the values of the tap coefficients stored in said storing means, the vectors $\underline{c}_{m,1}(n)$, $\underline{d}_{m,1}(n)$, $\underline{c}_{m,2}(n)$, and $\underline{d}_{m,2}(n)$ all being different from one another, and means for combining $u_{n,m}'$ and $u_{n,m}''$ with real and imaginary components of a respective sample of the received signal to form a complex echo compensated signal sample.

11. A data set including means for transmitting a passband signal representing first and second streams of data symbol components, means for receiving a signal which includes an echo of the transmitted signal, the components of each stream occurring at T second baud intervals, means for forming M echo replica samples associated with each baud interval, M being a selected integer, the $m^{th}$ of the M echo replica samples associated with the $n^{th}$ baud interval being formed in accordance with $$U_{n,m} = u'_{n,m} + ju''_{n,m}$$
$$= \underline{a'}_n^T \cdot \underline{c}_{m,1}(n) - \underline{b'}_n^T \cdot \underline{d}_{m,1}(n) + j[\underline{a'}_n^T \cdot \underline{c}_{m,2}(n) + \underline{b'}_n^T \cdot \underline{d}_{m,2}(n)]$$

where the superscript T denotes a transposed vector, the dots · denote the dot product of two vectors, $\underline{a}_n'$ is a vector representing a first series of data in said first stream, $\underline{b}_n'$ is a vector representing a second series of data in said second stream, and $\underline{c}_{m,1}(n)$, $\underline{c}_{m,2}(n)$, $\underline{d}_{m,1}(n)$, $\underline{d}_{m,2}(n)$ are vectors representing first to fourth pluralities of tap coefficients used to generate said $n^{th}$ echo replica sample, the vectors $\underline{c}_{m,1}(n)$, $\underline{d}_{m,1}(n)$, $\underline{c}_{m,2}(n)$, and $\underline{d}_{m,2}(n)$ all being different from one another, and means for combining $u_{n,m}'$ and $u_{n,m}''$ with real and imaginary components of a respective sample of said received signal to form an echo compensated signal sample.

12. An echo cancellation technique for use in conjunction with circuitry which transmits a passband signal representing first and second streams of data symbol components and which receives a signal which includes an echo of said transmitted signal, new components of each symbol stream occurring at T second baud intervals, said technique including the steps of:

storing a plurality of tap coefficient values, forming M echo replica samples associated with each baud interval, M being a selected integer, the $m^{th}$ of the M echo replica samples associated with the $n^{th}$ baud interval being formed in accordance with $$U_{n,m} = u'_{n,m} + ju''_{n,m}$$
$$= \underline{a}'^T_n \cdot \underline{c}_{m,1}(n) - \underline{b}'^T_n \cdot \underline{d}_{m,1}(n) + j[\underline{a}'^T_n \cdot \underline{c}_{m,2}(n) + \underline{b}'^T_n \cdot \underline{d}_{m,2}(n)]$$

where the superscript T denotes a transposed vector, the dots · denote the dot product of two vectors, $\underline{a}_n'$ is a vector which represents a sequence of the most recent data symbol components of said first stream of data symbol components, $\underline{b}_n'$ is a second vector which represents a sequence of the most recent data symbol components of said second stream of data symbol components, $\underline{c}_{m,1}(n)$, $\underline{d}_{m,1}(n)$, $\underline{c}_{m,2}(n)$ and $\underline{d}_{m,2}(n)$ are vectors representing the values of the stored tap coefficients, the vectors $\underline{c}_{m,1}(n)$, $\underline{d}_{m,1}(n)$, $\underline{c}_{m,2}(n)$, and $\underline{d}_{m,2}(n)$ all being different from one another, and combining $u_{n,m}'$ and $u_{n,m}''$ with real and imaginary components of a respective sample of the received signal to form a complex echo compensated signal sample.

* * * * *